May 10, 1927.

J. P. TARBOX

1,628,077

METHOD AND SYSTEM OF VIBRATORY SIGNAL CONTROL

Filed Oct. 22, 1923   3 Sheets-Sheet 3

INVENTOR

John P. Tarbox

Patented May 10, 1927.

1,628,077

UNITED STATES PATENT OFFICE.

JOHN P. TARBOX, OF GARDEN CITY, NEW YORK.

METHOD AND SYSTEM OF VIBRATORY SIGNAL CONTROL.

Original application filed April 10, 1917, Serial No. 161,016. Renewed November 12, 1921, Serial No. 564,621. Divided and this application filed October 22, 1923. Serial No. 669,888.

My invention relates to what I term a method and system of vibratory signal control, that is, an apparatus adapted to control another apparatus thru the received vibrational energy of sound electricity, magnetism, or other medium, wirelessly or otherwise transmitted.

My invention is adapted to the control of any agency whatsoever which it is desired to govern from a distance by vibrational energies. For example, it is especially adapted to effect code or other signal printing, to effect distant control of steering apparatus, to control a printing telegraph, to control locks, etc.

The vibrational control of the present application is that form especially adapted for the direct control of the record elements as distinguished from their control thru intermediate translating devices. The aim is to eliminate complications of tuned electrical circuits made up of suitably proportioned inductances and capacities, and to accomplish as simply and as directly as possible the control which is the aim of the apparatus. Any primary vibrating element or elements, circuit or circuits, may be utilized to receive and analyze the transmitted controlling vibrational energies. I have illustrated diaphragms of peculiar construction. These, however, are to be taken purely as illustrative. Other equivalent devices may be substituted for them without in any way altering the method and system which is the subject of this application. So far as novel the structure of the diaphragms is being covered in a divisional application.

The various parts of the diaphragms illustrated vibrate variously according to different wave lengths, frequencies, and intensities and combinations of the same. Differently vibrated portions of the diaphragm control each a different electrical control circuit. There are placed in these control circuits electro-magnetic relays of the type commonly known in the electrical art as slow relays, i. e., relays having periods of actuation different from their periods of restoration. The relays in turn control the circuits of the record elements. The particular slow relays illustrated are those having a period of restoration greater than the period of actuation whereby successive vibratory energizations retain the relays in actuated position, and the cessation only of such vibrations effects restoration. The restoration is utilized to determine the actuation of the record element. Such a system has many advantages the foremost of which, as aforesaid, is simplicity and directness of operation, but prominent among the advantages is the elimination of repetition of actuation upon the occurrence of sustained vibrations occurring in pronunciation at unwarranted times.

Referring to the drawings.

Figure 1:
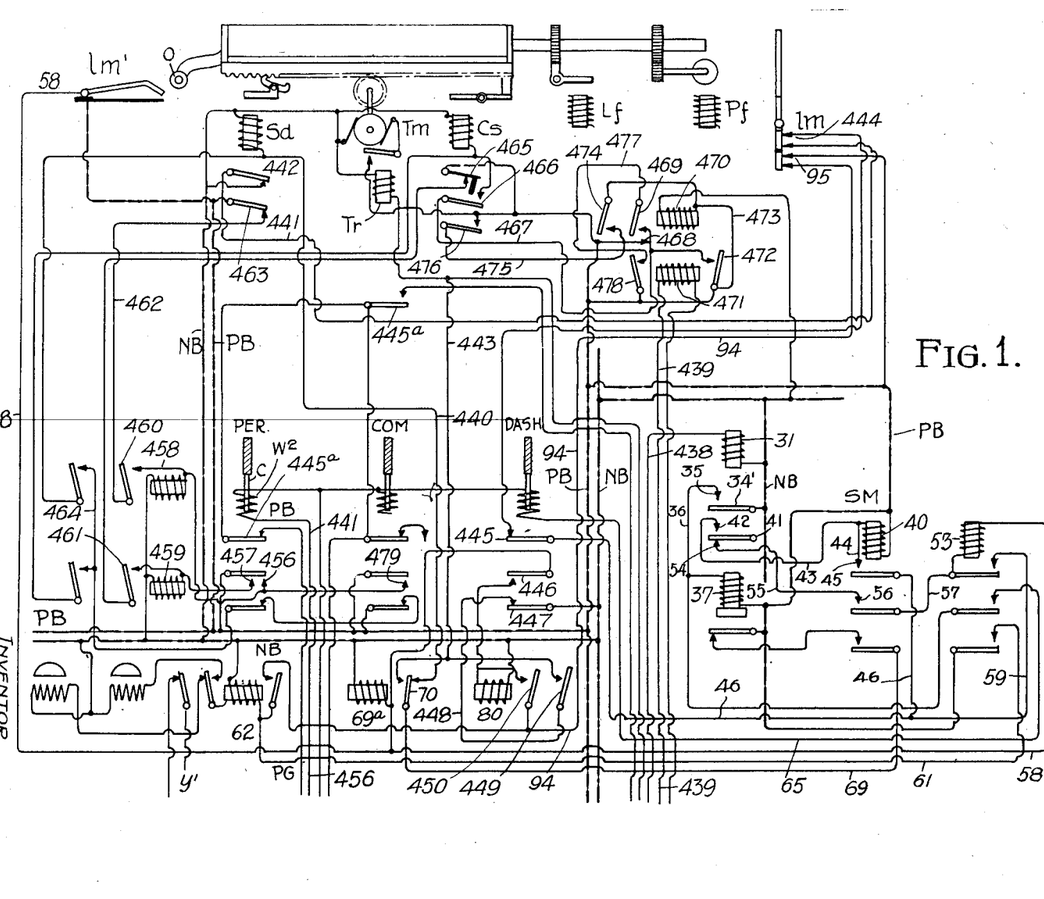
Figs. 1 and 2 illustrate diagrammatically when taken in connection with each other the system at large.
Figure 2:
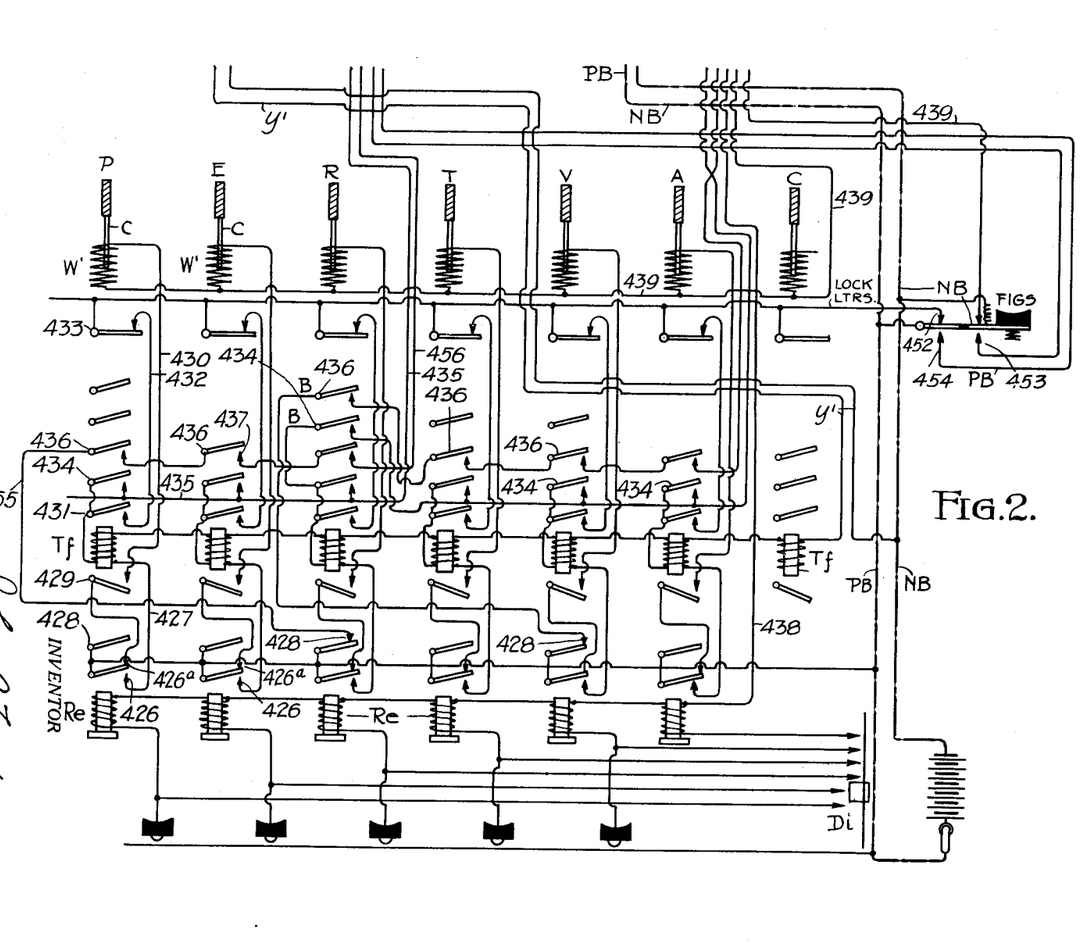

The method and system intended to be covered by this application comprise especially that portion of apparatus disclosed in Fig. 2 and the portion in the lower right hand of Fig. 1 designated there SM. The circuits of Fig. 2 are the "letter" and "figure" circuits while those in the lower right of Fig. 1 are those of the spacing mechanism, the function of which mechanism is to properly group the record of the various energy segregations accomplished by the circuits of Fig. 1 into syllable, word, phrase and sentence, groups or their equivalents. These groups will be of a character determined jointly by the character of the signals received and the relative perfection of the element which receives them. This element I term the primary vibrational control element.

The typewriter of the system per se may be of any of the various makes of typewriters at present on the market, especially those electrically operated, or of any similar machines disclosed in the patented or published typewriter art. I have shown this machine diagrammatically in the upper part of Fig. 1 and will give a brief description of the diagrammatic representations. For a fuller description reference is to be had to my co-pending application S. N. 161,016 filed April 10, 1917. Renewed Nov. 12, 1921. Serial No. 564,621, from which this application is divided.

C designates the transverse carriage and platen of the traversing record type of typewriting machine. TM designates an electric motor for traversing this carriage. The circuit of the motor is controlled by the relay Tr. The motor traverses the carriage in one direction (as for instance to the left) against the tension of a spring which redraws it to the right. Obviously, the other types of traverse may be employed, as for instance traverse of the type bars instead of the platen, a form of which, devised by me, is disclosed in my aforesaid application. In the type of Fig. 1 the type basket is stationary and its bars are designated PER, COM, P, E, R, T, V, etc. Traversing the type basket instead of the platen has the advantage that the automatic feeding of paper to the platen from rolls and duplicating by a continuous band of carbon, may be easily accomplished.

The record is stepped to left by a spacing device $Sd$. This device may be actuated each time a type bar is actuated, or the actuation of type bars may control an auxiliary device.

The line feeding is accomplished by an electric mechanically actuated line feed device LF, the mechanical features of which may be of any of the well known forms and which may be controlled by a special key or else by dictation, as in case of the control of the traverse motor hereinafter described, or on the other hand the feed device may be mechanically operated thru traverse movement as in case of several typewriters on the market today.

The paper feed, of greater extent than line feed, is accomplished by feed motor $Pf$ geared to the axis of the carriage $C^6$ by means of an extended shaft $s$ and the gears $g$, one of which is splined on shaft $s$. This motor may be controlled as in my parent application, or in the manner of the traverse motor to be described, or by special key.

The CAPS shift device is shown at the right of the traverse motor $Tm$ and is designated $Cs$. Its circuits and operation will be hereinafter traced. Suffice it to say that its armature is connected with the levers which control the type basket or platen shift as the case may be, to effect the record of capital letters instead of small letters.

Left and right marginal switches $lm$ and $lm'$ control the marginal operations of various devices. The right hand marginal switch $lm'$ (which appears on the left of the figure) is cam operated by cam roller $o$, connected with the carriage C, while the left hand marginal switch $lm$ is operated by shafts of the platen or other equivalent means.

The type beams or bars P, E, R, etc. are electro-magnetically actuated by actuating magnets shown as of the solenoid type and having each one or two windings $w'$, $w^2$, acting on a common core or armature $c$, adjustably connected with the type beams.

Any of these instrumentalities may be given any of the forms now so well known to the art. It is intended to illustrate but diagrammatically the utilization of motors, rotary, electro-magnetic or other, controlled thru the mechanism to be described to effect thru the application of power the movements of the respective devices with which the motive devices are associated. In fact, the motive devices themselves, may, like the devices which are actuated, be of any of the numerous well known forms.

The primary vibrational control element is the diaphragm $Dl$. This diaphragm is of the nature of a telephone transmitter. Any other primary vibrational control element known or to be known to the art may be substituted.

Figures 3, 4, 5, 6, 7:
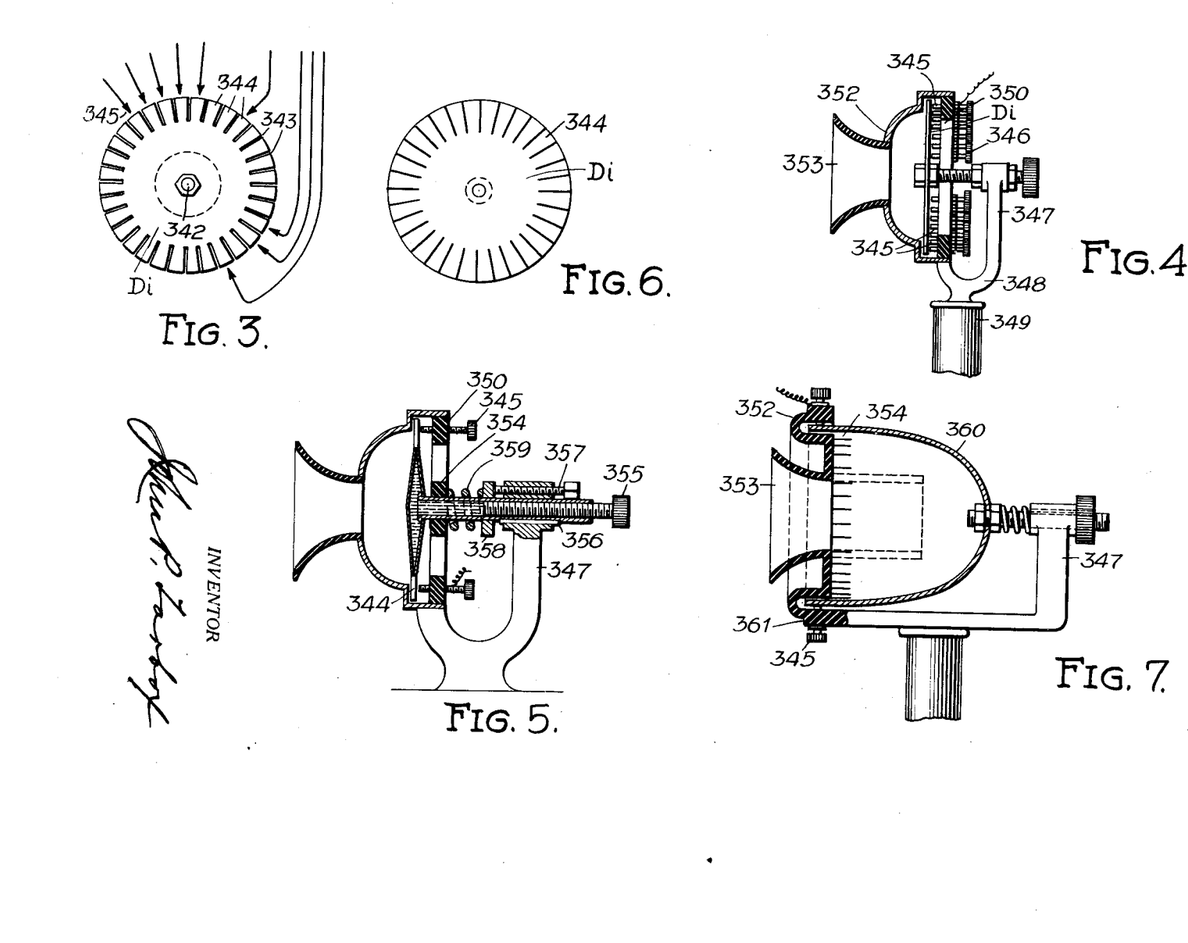
Figs. 3 to 7 are various forms of the primary vibrational control element.

In the form of Fig. 3 this diaphragm is pivoted at its center 342 instead of being supported at its outer edge and in operation vibrates on various diameters and circles, and combination of these forming the well known "chords of Chladni". The outer edge of the disk is provided with radial slits or slots 343 forming a plurality of more or less rigid spring fingers 344 which are thrown into forced vibration of greater extent than the vibration of the main body of the disk. Each of these fingers in vibration is arranged to close a particular electrical circuit. The pronounced sounds are thus in effect split up into their various components and each component effects the energization of a particular circuit. In constructing an element of this type, there is necessary of course adjustment of the contacts 345 each to the proper finger 344, and the adjustment of the spring and mass of fingers 344 to obtain proper differentiation. This can be readily determined by experiment, a particular finger or a particular plurality of fingers being set in highest vibration by a particular sound only. The fingers 344 may be tuned if desired, as in case of the Frahm frequency indicator being for this purpose made of not only more or less mass, but being made of greater or less tension. In the form of Fig. 4 the diaphragm $Di$ (which in this case shown as a simple diaphragm, the reeds or fingers being omitted) is supported rigidly at the front end of a screw 346 mounted adjustably in arm 347 of bracket 348 carried on pedestal 349. Also carried on the bracket in a plane parallel to that of diaphragm $Di$ is a contact ring 350 of insulating material thru which project adjustable contacts 345 in close proximity to the back face of the diaphragm. All of these parts and some others are shown of disproportionate thickness and distance from each other merely for clarity of delineation. Actually the diaphragms and the contact gaps may be only a few thousandths of an inch thru. Housing the diaphragm closely but not touching the same and extending in front thereof is a housing 352 into the center of which is let a mouthpiece 353 of the usual type found in telephone transmitters. Upon sounding into the mouthpiece the air in the interior of the housing 352 is set into vibration and the diaphragm vibrated correspondingly, with the result that the contacts 345 are closed in succession, singly or in combination.

Another form of this device is shown in Figs. 5 and 6. Similar parts bear similar reference numerals. The diaphragm in this form is hollow in the center, being formed of two disks sealed together at their outer edges adjacent the inner ends of fingers 344 after the fashion of a well known aneroid barometer. It is shown in front elevation in Fig. 5. It is supported on the outer end of a rigid tube 354 which communicates with the interior. The interior contains a fluid, compressible or non-compressible, the pressure of which, and hence the tension of the diaphragm, may be regulated by turning piston screw 355 threaded into the outer end of the tube 354. Tube 354 is supported directly in arm 347, being splined therein by key 356. It is adjustable by means of screw 357 in bracket 347 bearing against collar 358, secured on tube 354, and adapted to force collar 358 and tube 354 forward against the pressure of spiral spring 359 intermediate the collar 358 and the insulating ring 350. By this adjustment, as with the adjustment of screw 346, the diaphragm may be adjusted minutely with respect to contacts 345. This adjustment of the diaphragm as a whole, when employed with the adjustment of the individual contacts 345, makes possible adjustment to meet any existing relative vibrational condition as respects the various portions of the circumference of the disk.

In Fig. 7 is shown still another form, in which, instead of using the diaphragm, a parabolic bell 360 of thin sheet or other material having the proper vibrational qualities is made use of. The bell is adjustably supported from arm 347 as in case of the diaphragm, and its outer edge is slit or slotted to form fingers 344 lying approximately parallel with the axis of the bell. Contacts 345 are supported by ring 361 in a plane transversely of the axis of the bell, and housing 352 is supported directly from ring 361. The vibration in this form of analyzer is highly intensified, owing to the parabolic shape of the vibrating element, the vibration taking place on diameters perpendicular to the axis of the bell. If desired, the mouthpiece 353 may be extended inwardly, as shown in dotted lines, to a position approximately at the focus of the parabolical surfaces of the bell. As in the case of the device of Fig. 3 the dimensions here shown are disproportionate, and may be any dimensions conducive to the greatest efficiency of attainment of the effects set forth.

Any one of these several primary control elements may be used as indicated by the diaphragm $Di$ of Fig. 2. Indeed the control device of the patent to Ferguson No. 999,975, might (if operative) be so used, or any similar devices now known or to be known to this art, and properly classed as equivalents of those just described and under discussion. The fundamental requisite of such a device is that it shall be set into vibration variously by energy of the sound to differentially control a plurality of electric circuits associated therewith.

Referring now especially to Figs. 1 and 2, $Re$ are secondary relays controlled from the vocal analyzer $Di$. $Tf$ is a set of transfer relays intermediate the relays $Re$ and the actuating magnets $w'$. Relays $Re$ are of the slow relay type, i. e., quick to pull up and slow to retract, while relays $Tf$ are of the fast relay type. Each relay $Re$ makes two contacts, a front contact 426 controlling 427 of corresponding relay $Tf$ and a back contact 426$^a$ controlling thru front 429 of relay $Tf$ the circuit 430 of actuating magnet $w'$. Certain relays $Re$ make an additional back contact 428.

In addition to contacts 429 relays $Tf$ are provided with ordinary locking contacts 431 controlling their locking circuits 432 thru normally closed limit contacts 433 of magnets $w'$ of the type bars. The relays $Tf$ are further provided with parallel locking contacts 434 connecting with extraordinary locking circuits 435 to figure or carriage actuating magnets, and with series circuit closing contacts 436 controlling in series the circuits 437 of the figure or carriage actuating magnets, all as will appear more fully later on. As will be seen later too, some relays $Tf$ may have a plural number of contacts 434 and 436.

Relay group SM is a slow relay syllabilizing and spacing mechanism. It employs a method of differentiation of the time intervals between the individually differentiated signal sounds and the groups of such sounds, or the differentiation of the time intervals between syllables, or equivalent sub-groups of the group from the time intervals between successive groups. In my parent application above identified there are disclosed several ways of accomplishing this differentiation of which that here shown is one. It depends upon the continuity of energization of the slow relays $Re$ as indicated by the flow of energizing current in the common battery connection 438 of the group of relays $Re$. Consequently relay 31 of the group $Sm$ is energized as long as there is current in the common connection 438, that is, synchronously with the vibratory energization of the circuits of the relays $Re$. However, owing to the high frequency relay 31 does not fall back between all vibrations but only those separated by a period equal to or greater than its period of restoration.

If group sounds are made carefully in syllables it will be observed that the cessation of fundamental tone in each case marks the division of the word into syllables, and furthermore, marks the distinction between groups. The fundamental ceases for a longer period between groups than between syllables and we can and do at will vary the difference in length between these periods, generally to increase the length of the period between groups. This latter results in succinctness. The same is true of any equivalent grouping of signal vibrations. There may or may not be provided a relay Re responsive to a pervading or carrying wave of fundamental note through diaphragm Di. If provided relay 31 need not be adjusted so closely as in case of its omission, since it is not subject to deenergizations between characterizing individual sound vibrations by reason of the continuity of the fundamental vibration.

But the time of deenergization of the relay in conductor 438 measures the length of these periods. Relay 31 in turn controls by circuit NB, armature 34', front contact 35, and conductor 36, a relay 37, of what is commonly known to the art as the "slow relay type." This relay is provided usually with a copper sheath for its core whereby the time of its release or falling back is increased. As is well known in the art, this type of relay may be constructed and adjusted to fall back more or less rapidly. With respect to the time of falling back of this relay the time cessation of the circuit energizations or of fundamental tone as measured by relay 30 is compared. Relay 31 also when it pulls up energizes locking relay 40 over circuit from NB, armature 41, front contact 42, conductor 43, relay 40 and to bus PB. Relay locks up thru conductor 44, front contact 45, conductor 46, normally closed contacts 445 on Dash actuator conductor 448, normally closed contacts 444 of switch lm, conductor 441, normally closed contacts 442 of spacing magnet Sd, to negative bus NB. Thus relay 40 when locked up is unlocked upon the effecting of any one of dash, traverse, or space movements.

When relay 40 is locked up and relay 31 falls back during the closure of left limit switch lm', a second locking relay 53 is pulled up from NB, armature 41, back contact 54, conductor 55, front contact 56 or relay 40, conductor 57, relay 53, conductor 58, left limit switch lm', and battery PB. This relay 53 therefore is pulled up when relay 31 falls back when the left limit switch lm' of the typewriter carriage 6 is closed, and this switch is arranged to be closed whenever the writing reaches the marginal limit at the end of each line and throughout the right marginal space usually guarded by a bell for syllabilizing and traversing. Relay 53 locks up by conductor 59 to conductor 46 and over the same locking circuit as traced for relay 40.

As aforesaid, relay 31 falls back each time the circuit deenergization of relays Re is greater than its natural period of restoration, both between sound signal groups, and between syllable sub-groups. If between sub-groups the interval of restoration is too short to permit the slow acting relay 37 to release, but each time relay 31 falls back it partially closes the circuit of relay 53 at its back contact 54, thus continually testing for the marginal condition of circuit closure for relay 53 brought about by the closure of limit switch lm'. Upon finding such condition, whether between signal groups or between subgroups, relay 53 is energized. Pulling up and locking itself it closes one circuit and partially closes another, the first from bus NB by front contact 60, conductor 61, bell relay 62, and bus PB, and the second from bus NB, thru front contact 34', of relay 31, conductor 36, front contact 64 of relay 53, conductor 65, magnet M of the Dash actuator to PB, thus printing a dash after the latest subgroup pronounced. Note that this operation takes place only when relay 31 pulls up when relay 53 has locked up on the marginal limit switch lm', but it does not always take place when these conditions are present.

If before relay 31 has again pulled up, there has been a time interval of circuit deenergizations of relays Re and hence of relay 31 sufficient for slow relay 37 to drop back, this relay closes a circuit from PB by its back contact 66, conductor 67, front contact 68 of the first locking relay 40, conductor 69, back contact 70 of relay 69a, conductor 440, and magnet of the space actuating device Sd, to bus NB. Thus if there has been time for a slow relay 37 to fall back a space is registered. The energization of the magnet of the space device Sd opens contacts 442 in the locking circuit of relays 40 and 53, and they fall back, whereby, when relay 31 again pulls up the syllable or dash circuit previously traced is open at contact 64 of relay 53 and the dash magnet M is not energized.

Relay 37, as aforesaid, is a means of measuring the time interval of cessation of sound signals or of the fundamental as indicated by the time of deenergization or restoration of relay 31. Locking relay 40 functions principally as a means to enable the relay 31 to test for the marginal condition established by switch lm' on its back stroke only. In other words it functions as would a switching contact made by relay 31 in one direction only. Many forms of this are known and may be used. Relay 53 energized on the back stroke of relay 31 is an indicator of the existence of the test condition sought by relay 31.

To recapitulate, if when the test condition is indicated by relay 53, the interval of time of restoration permits relay 37 to fall back, the circuit 69 of the spacing device Sd is closed and relay 53 is deenergized, but if before this, the relay 31 again pulls up, the circuit 65 of the dash magnet M is closed thru contacts of relay 53 and the relay 53 thereafter deenergized by the opening of contacts 445 in the locking circuit. In sounding one has only to make the time intervals between syllabic sub-groups of signals less than that taken by slow relay 37 to fall back, and that between main groups of signals slightly greater, and spacing and syllabilizing will take place automatically. One of the relays Re may respond to the fundamental or carrying wave, or if that be not the case relay 31 is so adjusted that it restores only on syllable intervals of deenergization of relays Re.

Now resuming at the point where the spacing device Sd becomes energized, it will be noted that relay 69ᵃ is deenergized only when the marginal test condition of switch lm' is absent. Thus the spacing device Sd is actuated only in the absence of the marginal test condition. When switch lm' is closed 69ᵃ is energized over conductor 58 and by conductors 73 to NB. This shifts armature 74 from back contact 70 to front contact 75 from which extends conductor 443 to the traverse device relay Tr. Hence when relay 37 falls back with the printing on the margin, traverse is immediately registered instead of a space. This causes operation of the traverse motor TM without delay as will be later described to shift the carriage C to the beginning of the next line.

When relay 37 does not fall back, relay 31 on pulling up on the marginal condition as aforesaid records a dash. As in the case of traverse operation this record is printed in order immediately following the last letter of the preceding syllable. In record when the marginal condition is present (not at other times) the dash magnet M closes by front contacts 446 circuit from PB thru switch lm', conductor 58, conductors 73 and 79, relay 80 and conductor 81 to NB. Relay 80 locks itself to battery PB by conductor 94 thru locking contacts 450 and contacts 95 of lm, and partially closes by contacts 649 the circuit 443 of the traverse relay Tr thru conductor 448, and back contacts 447 of the dash magnet M. Thus when a dash marks a syllable on the margin traverse is effected upon the falling back of the dash magnet, and the carriage C is traversed immediately upon the printing of the dash, as it should be, to the beginning of the next line.

Now the dash is a mark of punctuation, and as such is representative of its class. Although limited space prevents the showing, it is intended that the effecting of the record of any mark of punctuation marking the termination of a syllable, word, phrase, sentence, or the equivalent, or the printing of any numeral, and the like, shall cause the traverse of the carriage C to the beginning of a new line. To this end the circuits and actuating devices of the other said punctuation and "figure" marks will be associated whenever found desirable, with the circuits of the traverse device in the manner described in connection with the dash register.

There are some cases in which this association will be unnecessary on account of the occurrence of a space interval immediately following the signaling of the punctuation mark, the timing relay 37 then effecting traverse instead of space as previously set forth.

Obviously, in the absence of the marginal test condition and during the printing in the body of the lines, while the relay 31 continuously tests for the marginal condition, no syllables are marked as a result of such a test, for relay 53 is deenergized until the marginal condition is found. On the other hand, whenever timing relay 37 measures a space interval it closes by conductor 69 independently of relay 53, the circuit of the space device Sd thru the back contact of the now deenergized relay 69ᵃ as traced above.

It has been said the bell relay 62 furnishes a guide to the operator as to marginal shifting. This relay upon being energized by relay 53, closes one circuit, opens another, and locks itself up. The first circuit is that of the bell magnet 88 extending from PB thru front contact 89 by conductor 90 to the magnet and thence by conductor 91 to NB. The circuit opened is the loop y' of the common battery connection of relays Tf (Fig. 2) and the opening is at back contact 92. The locking circuit is by front contact 93 to conductor 94 to normally close contacts 95 on the right hand limit switch lm, and to NB. Thus relay 62 remains locked up until the carriage C is shifted to the beginning of the new line whereupon it is unlocked.

It should be mentioned by the way that the line feed is accomplished by the traverse action as in the standard Oliver machine, or else in any other well known way, electrical or mechanical. It may also be mentioned that the points of operation of the switches lm and lm' may be adjusted at will thru adjustment suitably provided for any of the associated parts as may readily be done by the skilled engineer in accordance with the already known marginal adjustments of standard typewriting machines.

Hearing the bell 96 rung by magnet 88 the operator signals the next syllable or the next word as if nothing had happened and then stops. The letters of this next syllable or word are not printed because common conductor y' is open at contact 92. Signaling them, however, enables relay 37 to measure the time interval and determine the syllabilizing and ensuing traverse. This latter being accomplished, when relay 62 falls back it closes by back contact 97, and conductor 98 the circuits of another bell 99 of the same or different tone from the bell 96, whereby the operator is advised to proceed which he does by beginning with the sub-group or group following the sounding of the first bell 96. The bells follow each other of course in quick succession.

The interrelation of the various instrumentalities will now be understood from the description of the interconnecting circuits.

The relays Re are energized directly from the analyzer Di, which in itself, as aforesaid, may be of any recently known or future known form. It suffices that each relay Re is controlled from and by that portion of the analyzer responding to the characteristic vibrations of the sound of the letter imprinted by that actuating magnet $w'$ ultimately energized thru the particular relay Re. The circuits of all the relays Re are similar, extending from diaphragm Di, connected with battery PB thru the relays and thence to negative battery over common conductor 438, Figs. 2 and 1, and relay 31 of set SM. Thus relay 31 is energized each time as is relay Re, and thru relay 37 constantly measures the syllable and word intervals, with resultant appropriate energizations of space magnet Sd, dash magnet DASH, and traverse motor Tm, as will hereinafter appear.

Each time a relay Re pulls up, it closes and holds closed during the persistence of the characteristic vibration, the circuit PB, 426, 427, Tf, $y'$, NB, of a transfer relay Tf, Tf locks itself up over ordinary locking circuit 431, 433 to PR. 433 is a limit actuated locking contact on corresponding actuating magnet $w'$, actuated only at or near the limit of movement of the plunges or cores $c$. Thus Tf remains energized until the energy gathered by the type bar is sufficient to insure proper imprint. But $w'$ is not actuated until relay Re falls back, when it closes circuit 426ª, 429, 430, $w'$ from PB to NB by way of common conductor 439 (Figs. 2 and 1) including series relay 471 and normally closed contacts of the Figs. shift key (Fig. 2). Thus $w'$ throws type bar to the platen to imprint the letter or other signal character. At a point suitably near the limit of its movement its core $c$ strikes the limit contact 433 and opens the locking circuit of relay Tf, and in turn its own circuit at 429. Thus is the action made wholly positive with no chance of failure. Because Re closed circuit 430 by its back contact 426ª, there is no chance of doubling signal characters on sustained sounds which keep Re pulled up. Only when double letters or other characters bound sub-group intervals will signal characters be doubled, as is proper. In such cases relays Re will pull up two separate times, once at the end of a preceding sub-group and once at the beginning of a succeeding sub-group.

This is the operation for each actuating magnet $w'$, except that under certain conditions two or more relays Re may be combined to control a single actuator $w'$ as in my parent application.

The spacing mechanism SM when space intervals occur between main group sounds, closes thru back contact 70 of relay 69ª the circuit 440 of spacing magnet Sd which upon operating breaks at a suitable point in its operation the locking circuit 441 of relay 40 at locking circuits 442, making relay 40 ready for a succeeding operation. When the end of the line is reached both relays 63 and 69ª are energized thru the closure of $lm'$ over conductor 58 and the relay Tr of the traversing motor is submitted for Sd thru closure of front contact 70 of 69ª. The occurrence of a space interval effects closure of circuit 69, 60, 443, Tr, and traverse of the carriage ensues instead of space movement. Locking circuit of relay 40 is broken at the end of the traverse movement at contacts 444 on $lm$. If, however, under these conditions a sub-group interval occurs instead of a main group interval, the circuit 65 of dash actuating magnet M is closed thru contacts of relay 53. Actuation of the dash magnet opens locking circuit of 40 at limit contacts 445, closes circuit of relay 80 at contacts 446, and upon deenergization closes at 447 the circuit 448, 443 by way of front contacts 449 of relay 80. Inasmuch as relay 80 has locked up by its contacts 450 and circuit 94 to limit contacts 95 of switch $lm$, circuit 448, 443 is closed at 449 and relay Tr is energized as before, traversing the carriage after the dash registration, whereupon relay 80 is unlocked at contacts 95 along with relay 62. At the initiation of these movements bell 88 is sounded. At the completion bell 99 is sounded. In the period between the sounding of these bell signals no signaling is recorded by reason of the loop $y'$ in the circuit of relays Tf, but relays Re are active and relay 31 in their battery connection 438 thru this activity measures the syllabic sub-group intervals at the margin as aforesaid.

To record figure or equivalent combination signal characters the figures key FIGS is pressed. This breaks the connection of common conductor 438 with battery at contacts 451 and 452 respectively, and thereafter makes the connection of actuating magnets $w'$ of the figure characters and their associated locking contacts 445ª at contacts 453 and 454 respectively. Thus letter character magnets $w'$ and the normal locking circuits of relays T$f$ are disabled, while figure character magnets $w^2$ and abnormal locking circuits of relays T$f$ are enabled, for contacts 445$^a$ of the figure characters generally (see magnets $w^2$ of PER and COM for example) complete locking circuits 435 to which relays T$f$ individually lock in parallel by contacts 434. Thus if, for example, the word "period" or some other combination of sound signals be made in D$i$, and if for example the first three letters are the key letters, relays T$f$ of characters P, E and R pull up in succession and upon the pulling up of the last, that associated with the letter R, back contact 428 of that relay closes by conductors 455 and the series contacts 436 of relays T$f$ pulled up, the circuit 456 of the actuating magnet $w^2$ of the period actuator PER. The circuit is broken at limit contacts 445$^a$ when core $c$ of this actuator approaches the limit of its movement, simultaneously unlocking the relays T$f$ of the group P, E, R. Obviously any other letter or other signal groups or any single letter of the word may be chosen as the combination or key to the figure character and the actuating and locking circuits combined similarly. The criterion is that the letter or other signal combinations chosen as the keys to figure characters shall differ from each other. A combination of four letter groups T, R, A and V to control the energization of the traverse motor is also illustrated. Its circuits may be easily followed, being numbered similarly to those of the set P, E, R. It will be observed that the DASH has a winding $w^2$ energized in a manner similar to the period, and also a winding M controlled independently by the spacing mechanism SM. This is in accord with the disclosures of my parent application wherein there are disclosed two windings on each actuating magnet.

Upon the record of a period, space and capital carriage movements automatically take place. Upon actuation of magnet $w^2$ of PER contacts 456, 457 are closed, energizing relays 458 and 459 respectively. They lock up one over circuit 462 and contact 463 of magnet S$d$, and the other circuit 464 and contacts 465 of make before break pair 465, 466 of cap shift magnet CS. S$d$ and C$s$ are simultaneously actuated with resulting space and capital shift movements whereupon relays 458 and 459 are unlocked. S$d$ promptly falls back but C$s$ remains locked up over circuit 467, closed by its locking contacts 466 before 465 are broken and including contacts 468 of make before break pair 468, 469 of relay 470. A relay 471 in series with common battery conductor 439 of the actuating magnets $w'$ controls by its contacts 472 the actuating circuit 473 of magnet 470. Magnet 470 locks itself up by its contacts 474 and circuit 475 thru contacts 476 of caps magnet C$s$. Simultaneously it transfers locking circuit 467 of caps magnet C$s$ by way of make contact 469 and conductor 477 to control of relay 471 at contact 478. Thus the moment before the first character is recorded and the corresponding current impulse in conductor 439 has died, C$s$ is unlocked at contacts 478 and the carriage drops to normal position for the second letter. Thus the first letter only of the word following the period has been capitalized and subsequent letters are ordinary type. Contact 476 of C$s$ in falling back unlocks relay 470 restoring it to normal status.

The actuation of the comma magnet COM will automatically effect actuation of the space magnet S$d$ by closing at 479 the circuit of relay 458 is parallel with contacts 456. Thus space also automatically follows comma.

Clearly, a system having these features will be of great utility in increasing the speed of operation of manual controlled machines, electrically operated machines, and printing telegraphs, and this class of machines generally. For instance, referring to the manually operated machines, it will be seen that the automatic spacing and capitalizing following period eliminates three movements on the part of the operator, and that of the automatic spacing following comma and other coordinate marks of punctuation, eliminates each time one movement. The various other automatic operations cut down the times correspondingly, and in cutting down the time also cut down the effort of the operator, lessening the fatigue.

It is believed that all other coordinate, similar or related operations will be fully understood from the circuits outlined, especially in conjunction with the full description of the enlarged system hereinbefore given. Obviously, primary and secondary registers may be interposed in these circuits as well as in those of the several forms of the invention disclosed in my parent application. Obviously, also, there may be provided all the manually operable supplemental control keys. Devices L$f$ and P$f$ may be controlled by hand or in the manner of the device T$m$. The outstanding features (though far from only one) of this system is, however, the circuits between the primary vibrational controller and the actuator magnets $w'$ whereby the immediate register, if desired, may be omitted and positive and regular operation assured. It is only necessary to have the typewriter mechanism light and fast enough in operation to insure record synchronously with the actuation of relays R$e$ and T$f$.

The element D$i$ instead of being of the form invented by me may be of any of the forms now known or to be known to the art. Thus either the Ferguson or Flowers types may be substituted, provided they are sufficiently efficient for practical use. Ferguson has used a diaphragm while Flowers has used tuned reeds and electrically tuned circuits. Others too have proposed tuned circuits or resonant circuits. There are still others.

The circuits herein disclosed may be applied to any form of typewriter known in the art. Some of them have one form of key board and one form of key shift, and some other forms. The shifting and traversing movements are various. They differ in many ways. I have already indicated the interchangability of shifting carriage and of banks of type bars, illustrating in my parent application one in connection with the diagrammatic showing of my invention and the other in connection with the machine using paper from the rolls.

It is apparent also that the figure shift key FIGS or its equivalent may be used for paragraph, traverse, and the like shifts which may then be signaled to the machine while the FIGS key is pressed. The FIGS key always means a word combination, but may not always mean a platen or type basket shift. The word signaled determines this thru the combination circuits 456 and it varies with variation of the key board. A special manually controlled CAPS key and other controlling circuits for magnets Cs may be provided as in my parent application. All numerals on the universal keyboard are printed without a platen shift, but on some machines a platen shift accompanies such printing and is incident to it. However it is believed that with the advent of commercial systems of this class the typewriting machine will be built especially for the work and not adapted to it.

The syllabic sub-groups of current impulses in common battery lead 438 of relays Re are separated by periods of time proportional to syllabic and space intervals. It is believed best that the relay 31 be adjusted a trifle slow in operation so that intervals less than syllabic intervals between current impulses may not possibly result in the falling back prematurely. The natural characteristics of the relay may be found entirely sufficient for this purpose. If not it can be given the characteristics of a slow relay.

Obviously all control actions or interoperations coordinate with those described may be carried out by means similar to those described. For instance all characters the imprint of which is surrounded or imposed with the same conditions, or similarly interrelated to other characters and operations, may be secured thru a similar train of operations carried out by a similar train of devices. It has therefore been unnecessary to illustrate all operations or all movements as applying to all the movements and operations which will appertain to the commercial machine.

It goes without saying that all modifications of my invention not falling without its generic spirit are comprehended in the annexed claims.

What is claimed is:

1. A system of vibratory signal control comprising a primary vibration receiving device, a translating device associated with said receiving device during both its vibratory energization and deenergization and in the one case itself energized and in the other case deenergized and by its state of energization differentiating between the conditions of energization and deenergization of the receiving device, and an electromagnetic actuating element of a signal recording machine the operation of which is controlled by said translating device.

2. A system of vibratory signal control comprising a primary sound vibration receiving device, a translating device associated with said receiving device during both its vibratory energization and denergization and in the one case itself energized and in the other case deenergized, and by its state of energization differentiating between the conditions of energization and deenergization of the receiving device, a timing element connected with said translating device to measure the period of energization or deenergization thereof, character actuating element of a signal recording machine controlled by said translating device, and a second actuating element controlled by said timing device.

3. A system of vibratory signal control comprising a primary sound vibration receiving device set into vibration variously by the energy of the vibratory signals received and during periods energized and during other periods deenergized, an energy timing device controlled thereby to gauge the periods of energization and deenergization thereof, and an electromagnetic actuating element of a signal recording machine controlled in turn by said timing device.

4. A system of vibratory sound signal control comprising a series of electrical circuits variously energized in response to the energy of (vibratory signals received), an electromagnetic slow relay controlled therethru and having a period of restoration greater than that normally existing between certain of said energizations of said circuits whereby its restoration indicates a length or period of deenergization of said circuits equal to or greater than its period of restoration, together with an electromagnetic actuating device of a signal recording machine operated by said slow relay upon its restoration.

5. A system of vibratory sound signal control comprising a series of electrical circuits variously energized for various periods through the energy of vibratory signals received, a relay controlled from said circuits and energized whenever any one of said circuits is energized, a slow relay controlled by said first named relay and having a period of restoration greater than that deenergization of said circuits caused by the time interval between syllabic signals received, together with an actuating device of a signal recording machine controlled by said slow relay.

6. A system of vibratory sound signal control comprising a series of electrical circuits variously energized for various periods through the energy of the vibratory signals received, a relay controlled from said circuits and energized whenever any one of said circuits is energized, a slow relay controlled by said first named relay and having a period of restoration greater than that between energizations upon successive syllabic signals of a determinate group and a translating device controlled by said slow relay.

7. A system of vibratory sound signal control comprising a plurality of electrical circuits energized through the energy of sound, a relay energized synchronously therewith and having a period of restoration greater than that existing between the energizations caused by the elements of individual vibratory signals, but less than the periods between successive vibratory signals of a determinate group, a locking relay initially energized thru energization of said first named relay and pre-establishing a circuit to be controlled, and control means for the pre-established circuit operative to close the circuit upon restoration of said first named relay.

8. A system of vibratory sound signal control comprising a series of electrical circuits variously energized through the energy of the vibratory signals received, a locking relay partially establishing the circuit of a controlling device, which locking relay is initially energized thru energization of said circuits, a slow relay having a period of restoration greater than the period normally existing between energies of said circuits effected by successive vibratory signals of a determinate group and itself energized also thru energization of said plurality of circuits, together with means operative upon restoration of said slow relay to control the partially established circuit of said controlling device.

9. A system of vibratory sound signal control comprising a plurality of electrical circuits variously energized through the vibratory signals received, a timing device connected with said circuits to gauge the intervals between sub-group and group signal energizations thereof, translating devices connected with said circuits to record the occurrences of said energizations thru circuit controlled actuations thereof, a record bearing element, and a controlling device therefor affecting said record bearing element and the circuit of which is controlled by said timing device.

10. A system of vibratory sound signal control comprising a plurality of electrical circuits variously energized through the vibratory signals received, a timing device connected with said circuits to gauge the intervals between certain energizations thereof, translating devices connected with said circuits to record the occurrence of said energizations thru circuit controlled actuations, a record bearing element, a relay locked up when the record bearing element reaches a predetermined position, and a record controlling device for the record bearing element, the circuit of which is controlled jointly by said timing device and said locking relay.

11. A system of vibratory sound signal control comprising a plurality of electrical circuits variously energized through the vibratory signals received, a timing device connected with said circuits to gauge the intervals between certain energizations thereof, translating devices connected with said circuits to record the occurrence of said energizations thru circuit controlled actuations, a record bearing element, a controlling device therefor, the circuit of which is controlled jointly by said timing device and the position of said record bearing element, and a second controlling device for said record bearing element the circuit of which is controlled by said timing device independently of the position of said record bearing element.

12. A system of vibratory sound signal control comprising an energy controlling device actuated variously through the vibratory signals received, a plurality of electrical signal character circuits controlled from various parts each circuit including a slow relay having a period of restoration greater than its period of energization, and each in turn controlling a translating device upon its restoration only.

13. A system of vibratory sound signal control comprising a circuit controlling device actuated through the energy of the vibratory signals received, a plurality of signal character circuits differentially controlled thereby and each including a relay having a period of pulling up different from its period of falling back, and translating devices arranged to effect a record controlled each by at least one of said relays, and some commonly by a plurality of said relays.

14. A system of vibratory sound signal control, comprising a device actuated through the energy of the vibratory signals received, a plurality of electric signal character circuits differentially but commonly controlled thereby, a timing device in each of said circuits responsive to the energy therein to maintain an attitude of responses during period of deenergization of said circuits of determinate magnitude and to restore to normal condition upon the occurrence of periods of deenergization greater than the determinate magnitude, a relay locked up on the action of initial response of any of said timing devices, and a controlling device having its circuit jointly controlled by said timing device upon restoration and said locking relay.

15. A system of vibratory sound signal control comprising a controlling device actuated through the energy of the vibratory signals received, a plurality of electrical signal character circuits differentially and commonly controlled thereby, a timing device in each of said circuits responsive to the energy therein to maintain an attitude of responses during period of deenergization of determinate magnitude and to restore to normal condition upon the occurrence of deenergization greater than the determinate magnitude, relays locked up on the occasions of initial response of said timing devices, controlling devices having their circuits jointly controlled by said timing devices upon restoration and said locking relays and additional controlling devices having their circuits controlled jointly by groups of said timing devices and locking relays.

16. An elemental sound vibration controlled circuit comprising an electromagnetic slow relay, a sound actuated element controlling the circuit thereof, and an electromagnetic character actuating device of a character recording machine having a circuit controlled by said slow relay.

17. An elemental sound vibration controlled circuit comprising a slow relay, a sound actuated element controlling the circuit thereof, and a translating device having a circuit partially closed on energization of said slow relay and completed upon deenergization thereof.

18. A sound vibration controlled circuit comprising a sound vibrated device, a timing device measuring the continuity of vibrations of said sound responsive device, and an individual character circuit of a character recording machine controlled by said timing device.

19. A sound vibration controlled system of circuits comprising a sound vibrated element, a timing device, a locking relay, and a translating device serially controlling each other, and the last, of which is controlled by the second thru the control of the third.

20. A sound vibration controlled system of circuits comprising a sound vibrated element, timing devices, locking relays, and translating devices, the circuit of one of the latter being predetermined by operation of a plurality of each of the timing devices.

21. A system of vibratory signal control comprising a sound vibratory device set into vibration by the energy of sound, a translating device associated with said vibratory device during both its energization and its deenergization and in the one case itself energized and in other case deenergized and by its state of energization differentiating between conditions of energization and deenergization of the vibratory device, and a recording element controlled by said translating device.

22. A system of vibratory signal control comprising a sound vibratory device set into vibration by the energy of sound, a translating device associated with said vibratory device during both its vibratory energization and deenergizations and in the one case itself energized and in the other case deenergized, and by its state of energization differentiating between the conditions of energization and deenergization of the vibratory device, a timing element connected with the translating device to measure the period of energization or deenergization thereof, a recording element for a character controlled by said translating device, and a spacing element controlled by said timing device.

23. A sound vibration controlled system of circuits comprising a sound vibrated element, a timing device, a locking relay, and a translating device serially controlling each other, and the last of which is controlled by the second thru the control of the third, and the third of which is after initial control by the second, placed under control of the fourth of said devices.

In testimony whereof I hereunto affix my signature.

JOHN P. TARBOX.